United States Patent [19]
Bright

[11] 3,718,524
[45] Feb. 27, 1973

[54] APPARATUS FOR FORMING ATTACHABLE INCOMPLETELY-CURED PLASTIC WAFERS

[76] Inventor: Elvin M. Bright, 17242 Bircher Street, Granada Hills, Calif.

[22] Filed: Aug. 28, 1970

[21] Appl. No.: 67,898

Related U.S. Application Data

[63] Continuation-in-part of Ser. No. 686,170, Nov. 28, 1967, Pat. No. 3,609,114.

[52] U.S. Cl. ................. 156/500, 156/246, 425/261
[51] Int. Cl. ............................................. B29b 5/00
[58] Field of Search ......... 156/500, 246; 18/4 B, 4 C, 18/5 A, 9, 10; 425/261, 440

[56] References Cited

UNITED STATES PATENTS

| | | | |
|---|---|---|---|
| 3,121,253 | 2/1964 | Varrial | 18/5 A |
| 2,916,765 | 12/1959 | Heller | 18/4 C |
| 3,253,345 | 5/1966 | Kowalik | 18/4 C X |
| 3,426,388 | 2/1969 | Prohaska | 18/4 C |
| 3,223,053 | 12/1965 | Jimenez et al | 18/4 B X |
| 2,865,046 | 12/1958 | Bird | 18/4 C X |

FOREIGN PATENTS OR APPLICATIONS

| | | | |
|---|---|---|---|
| 1,185,035 | 2/1959 | France | 18/4 C |

*Primary Examiner*—Benjamin A. Borchelt
*Assistant Examiner*—G. E. Montone
*Attorney*—Sellers and Brace

[57] ABSTRACT

Apparatus for continuously forming delicately configured, partially polymerized decorative plastic wafers in condition for attachment and in situ curing on a supporting surface. Measured charges of flowable, plastic material are charged into preheated open-top molds where they assume a level top surface with the underface conforming to the mold configuration. After a period of travel the wafer is ejected when still incompletely polymerized but with its configured undersurface capable of lying on a planar surface without deformation. The succession of flexible, silicone rubber molds are secured to a flexible endless belt conveyor which moves them from a charging station to an ejection station in a period calculated to effect, say, 75 percent polymerization of the plastic. Each wafer is there ejected by arcing of the moving conveyor belt, as by abrupt direction-reversal over a guide roller. A slide plate then guides the emerging wafers onto a second conveyor without inversion, where their exposed top planar faces are roller-coated with adhesive and polymerization catalyst, then heated and conveyed to a bonding station for attachment to a supporting surface, such as a curved ceramic article.

11 Claims, 5 Drawing Figures

PATENTED FEB 27 1973 3,718,524
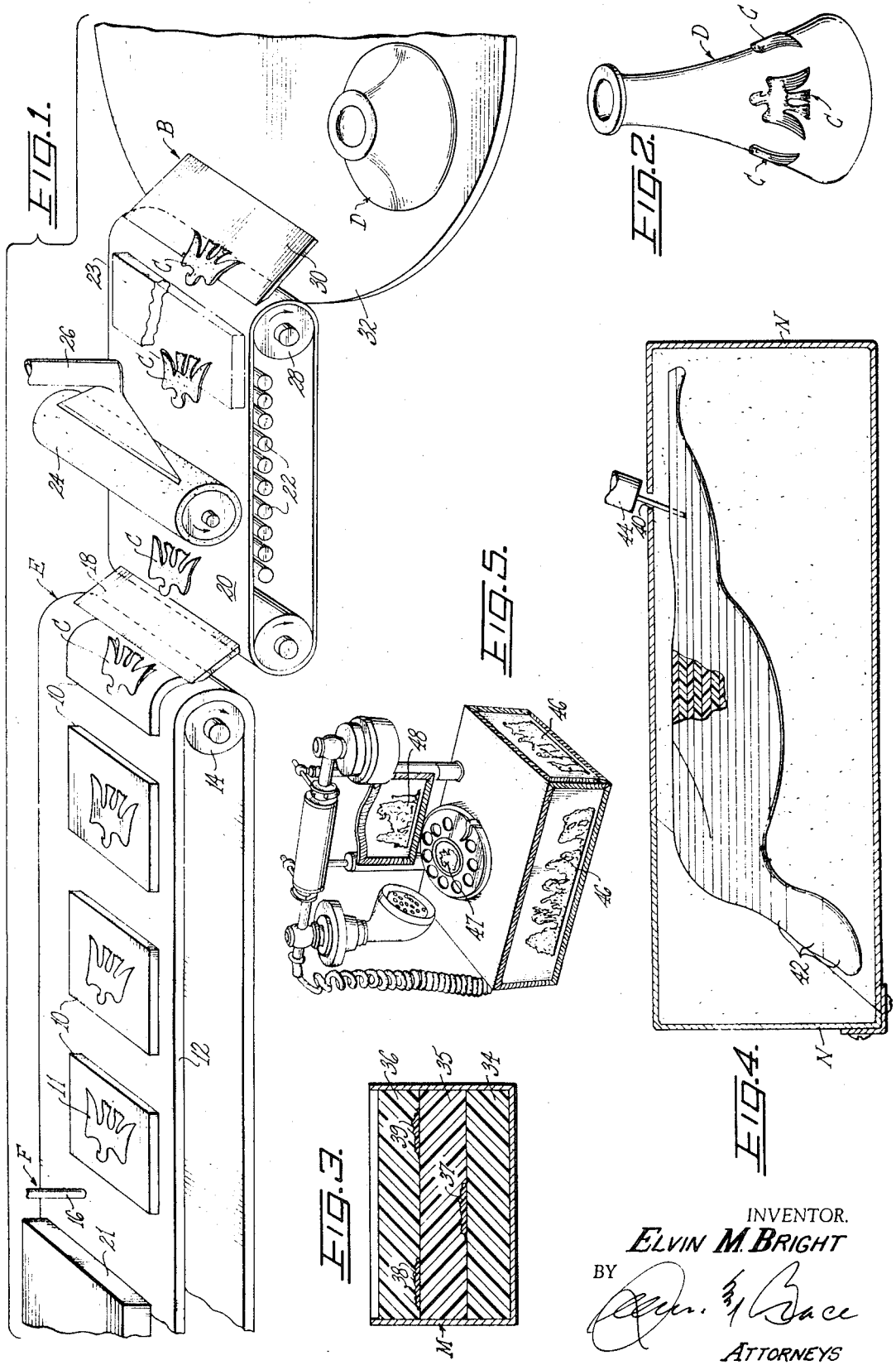
INVENTOR.
ELVIN M. BRIGHT
BY
ATTORNEYS

APPARATUS FOR FORMING ATTACHABLE INCOMPLETELY-CURED PLASTIC WAFERS

This is a continuation-in-part application of my pending application for U.S. Letters Pat. Ser. No. 686,170, filed Nov. 28, 1967, now Pat. No. 360,9114, entitled Moldable Interpolymers, Cast Products Thereof and Apparatus for the Processing Thereof.

As noted in the foregoing abstract, this invention provides apparatus for continuously molding delicately profiled or configurated wafers of incompletely cured or partially polymerized plastic material, which relatively thin wafers thus profiled on the obverse side and generally planar on the reverse side are successively bond-coated as with polymerization catalyst and/or adhesive material on the reverse face heated and conformingly attached to a supporting surface such as a curved ceramic article where they can cure in situ to an inseparable condition in a relatively short time. The invention provides an endless belt conveyor to which are attached a sequence of shallow, open-top, flexible molds which are carried by the conveyor from a mold-charging station to a wafer-ejection station in a predetermined time interval such as calculated to effect say 75 percent polymerization of the contained plastic. At the ejection station successive molds typically formed of silicone rubber are rather abruptly flexed as by direction-reversal of the conveyor belt over a terminal guide roller, so as to progressively eject the molded wafer which then descends across an angularly directed slide plate to a second conveyor or support surface. The wafer has congealed or solidified sufficiently in the allotted travel time that it is now capable of lying on its molded or profiled face without deformation. When thus supported on the second conveyor, its exposed planar face is sprayed or roller-coated with heat-curable bonding material such as silicone resin adhesive and polymerization catalyst such as gamma aminopropyl-triethoxysilane. The coated wafer, heated to obtain shorter curing time may then be pressed conformingly against a supporting surface to which it cures or sets to an infusible condition.

Initially the molds, prior to the charging station may also be heated, or the plastic charge itself may be heated, and the travel time of the conveyor-carried mold, between charging-station and ejection station will of course be varied in accordance with the longer reaction time required for a thermosetting resin at lower temperature.

The present application is particularly applicable for use with thermosetting resins which do not recede from the mold face in casting. Hence the casting can reproduce fine engraving-like surface configuration. Such resinous material is detailed and exemplified in my pending U.S. Pat. application, Ser. No. 686,170.

In brief, by maintaining a major portion of about 75 percent to about 85 percent weight of glycidyl-ether type epoxy resin it is found that the singular volumetric contraction or mold-adhering property of epoxy resin is imparted to the entire mass. It has also been found that this epoxy resin can be formed into a tripolymer having the aforementioned properties while exhibiting the transparency and refractive properties of acrylate and methacrylate resins, by the selection of a nearly water-white, high-boiling liquid glycidyl ester of low viscosity and which is both a solvent for the epoxy prepolymer and also will mix freely with a selected acrylic monomer without clouding. Further, by using catalyst for epoxy-polymerization which is miscible with colorant material and which also further lowers the viscosity of the fluid mix, the catalyst and coloring agent can be initially and uniformly dispersed through the transparent mass before polymerization, thereby imparting the desired hue to the final product. Also mineral-colorant in fine particulate form can be dispersed or suspended in the initial mixture by the aid of micronized silica to form up to about 90 percent weight of the whole, so as to be cast into the body of congealing interpolymer and simulate a body of any of a large number of natural stones including jade, onyx, marble and many others.

Alternately, artifacts such as statuettes or even natural pieces of rock or the like, can be embedded in protective transparent castings of the resin composition. Also, in a still-fluid coating, by use of a hypodermic needle or syringe, portions of the same interpolymer composition having a different color and/or density than the body of casting, can be introduced at selected levels of the fluid body and there persist without coalescing with the body until the whole is cured into an integral block with the distinct "inserts" remaining clearly discernable in a transparent body.

Commercially available liquid epoxy resins or prepolymers may be used. For example, "Epon Resin 826" sold by Shell Chemical Co. is a diglycidyl ether, bisphenol-A type liquid epoxy resin or prepolymer. It has an epoxide equivalent of 180–188, viscosity 65–95, maximum color 2 (Gardner), density 1.164 g/ml, hydroxyl content 0.025 eq. OH/100g. resin, and is supplied without diluents.

A suitable "reaction solvent" or diluent for the epoxy resin is "Cardura E" sold by Shell Chemical Co. This is a mixture of high-boiling, low viscosity, liquid glycidyl esters of tri-alkyl carboxylic acids, forming a water-white fluid. The mixture has the general formula

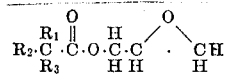

wherein $R_1$, $R_2$, $R_3$, are alkyl radicals totaling $C_{7-9}$, or a molecular formula of $C_{12-14}H_{22-26}O_3$; boiling point 275° C; density 0.972 g/ml; viscosity 7–8 cps; solubility in water 0.03 percent weight at 20° C.

To produce interpolymers having the present advantageous properties suitable reactive monomers are normally liquid, colorless alkyl acrylates characterized by alkyl radicals having about six to about 10 carbon atoms and which are miscible without clouding in the epoxy-glycidyl ester mix. An outstanding example is 2-ethylhexylacrylate. Hexylacrylate as well as corresponding branched alkylacrylates are less satisfactory but often usable, sometimes in admixture. The final solubility with all other components of the mix should be tested in each case.

Any of the class of known epoxy polymerization catalysts, particularly the trialkylamines, will promote the present interpolymerization or curing of the composition; however, many are unsatisfactory for other reasons, because of increasing the viscosity of the fluid mix, and/or imparting cloudiness or discoloration to it, etc. An outstandingly effective catalyst is N-aminoethyl piperazine (AEP) which is employed on the order of about 15 percent weight to about 22 percent weight since it is freely miscible without discoloring the mix, and also acts as a dispersant for added colorants of the known group of colorants for epoxy resins which may be incorporated at the same time. In addition, this preferred catalyst desirably further decreases the viscosity of the polymeric mixture on the order of 10 to 30 percent.

A particularly advantageous characteristic of the present polymeric composition is its pronounced workability when in a pliable cohesive state of incomplete polymerization designated somewhat arbitrarily as being about 75 percent polymerized. This corresponds to a Barcol hardness of about 30 as contrasted with a Barcol hardness of about 40 to 45 and a Rockwell M of about 95 at complete cure. The mixture arrives at this state in about 8 hours at ambient room temperature or in about 2 hours at 150° F; or in about 20 minutes at 250° F. When using about 18 percent weight catalyst, after casting or other shaping operation a complete cure is achieved in an additional 72 hours at ambient room temperature; or in about 6 to 8 hours at 150° F; or in about 10 minutes at 250°. At this 75 percent polymerization, the cohesive material can be readily shaped or molded and is capable of 150 to 300 percent elongation without inducing stress. It is particularly adapted to casting centrifugally. The cured product has an impact strength approximately three times that of typical epoxy resin, or 1.5 ft. lb. per inch notch; a tensile strength of 10,000 PSI; and a flexural strength of 12,000 to 16,000 pounds.

The invention may be further illustrated by reference to the accompanying drawing wherein:

FIG. 1 is a semi-schematic perspective view of apparatus for continuously casting, ejecting and adhesively coating incompletely cured, flexible, decorative wafers of the invention polymeric material ready for bonding to a suitable supporting surface;

FIG. 2 is a perspective view of a ceramic vase with several of the decorative wafers of FIG. 1 permanently bonded thereto;

FIG. 3 is a vertical section taken through a composite casting of three layers of different colors or transparency including inlays of the same material located at different levels therein before the whole is cured;

FIG. 4 is a longitudinal vertical sectional view taken through a multilayered art-object formed of successive layers of different density material stratifying from a poured mix and cured to a solid integral article; and FIG. 5 is a perspective view of a telephone handset and cradle, the latter being constructed in part of cast decorative panels of the present material.

As is particularly illustrated in FIG. 1, there is provided a longitudinal sequence of open-top molds 10 of suitable flexible material such as silicon rubber, each having a profiled mold cavity, secured to a flexible endless belt conveyor 12 which is movable in a deliberately timed rate of speed by suitable drive means 14. The empty molds 10 are initially heated to about 150° F. by infrared heaters 21. Measured amounts of the present flowable plastic material are metered into each successive preheated mold cavity 11 through a supply nozzle 16 at a loading or mold-charging station F, the upper surface of the plastic assuming a level or planar configuration and the underface conforming to the mold. The rate of conveyor travel is correlated with the approximately 75 percent polymerized or "cohesive-pliable" setting time of the plastic material so that, as each mold 10 arrives at the ejection station E, the relatively thin wafer or casting C has congealed but with pressure may be easily flexed against so as to conform to a curved support surface; otherwise it retains its molded configuration and with its profiled undersurface lying down on a flat surface without deforming the newly molded underface. The upper planar face can of course also be subsequently conformed to a planar rather than curved surface.

Accordingly, as the flexible mold 10 is bent down in response to relatively abrupt arcing or direction reversal of the flexible belt 12 in curving around the roller 14, the congealed casting C is progressively released from the mold and its free, leading edge moves over an angularly disposed slide-plate 18 onto another or second conveyor 20. The latter closely overlays a bank of heating elements 22 of any suitable character well known in this art, to warm the ejected wafer to a "rapid cure" temperature as, for example, about 250° F. At the same time, a roller coater 24 applies a covering of heat-durable, bonding material such as silicone resin adhesive (e.g. General Electric Co., SR529 from which volatile solvent has been removed) containing about 5 percent weight silicone polymerization catalyst (gamma aminopropyltriethoxysilane) to the exposed, flat, back face of wafer C. Such coating material, supplied from a reservoir 26, is equally suitable for permanently bonding the wafer to diverse rigid surfaces or objects including ceramic, metal, wood, plastic, etc.

Prior to reaching drive roller 28, the coated wafer is further heated by infrared heating units 23 before passing down a second slide plate 30 to an attachment or bonding station B. There, successive heated and coated wafers C are pressed conformingly against the side of support surfaces, such as the sides of unheated ceramic articles D supplied by a rotary table 32. The assemblies are then allowed to cure by standing for about 24 hours, thereby producing the finished article such as shown in FIG. 2. The resulting assembly is inseparable into its original components and is thoroughly permanent in every respect.

FIGS. 3 and 4 illustrate multilayered castings formed of the present material. FIG. 3 shows a deeper, open-top, flexible mold M with successive layers 34, 35, 36 of the present composition and differing only in the presence of different amounts of added finely ground mineral colorant or other dye, the background layer 34 being more heavily colored to render it opaque, the intermediate layer 35 being tinted but still transparent, and the outer layer 36 being clear and without colorant. Smaller "inserts" 37, 38, 39 of the same polymeric material are placed or injected as by the aforementioned hypodermic needle technique at selected levels, not necessarily atop a layer. In particular, the injected insert of polymeric material may be shaped to any desired configuration giving it vertical dimension within the fluid block, by use of such a needle point, thereby producing a true one-piece, integral three-dimensional object when cured. It is thus possible to "paint" or mold three-dimensionally, within—that is, beneath the surface of—the block of subsequently solidified plastic.

FIG. 4 shows a two-piece mold N having a pour opening 40 through which successive layers 42 of liquid material incorporating differing concentrations of mineral particles of differing densities are introduced as by a syringe or pipette 44. In has been found that if mineral additives having densities, differing by a minimum of about 5 percent, such as those mentioned in Examples 2 to 4 below, are initially uniformly dispersed in the present polymerizable composition, and the mixture then allowed to stand after charging into the mold, the additives stratify into several levels in the order of their respective specific gravities. Thus a mixture of four mineral additives such as aluminum silicate, calcium carbonate, copper carbonate, barium sulfate readily separate into four layers before gelling. If desired, another quantity of mix can then be added to the mold to form additional layers. Each separating layer will have a thickness proportional to the quantity of mineral present. Since the different additives each impart a different color to the final cured product, the latter will be formed with layers or strata of different colors. By using minerals having densities differing by less than about 5 percent, the mold-separated layers can be controllably blended or merged into one another, thereby producing pleasing esthetic effects of a wide variety. By this technique the artisan is enabled to provide art objects and to duplicate and simulate substantially any mineral coloration found in natural minerals.

FIG. 5 shows a telephone handset and cradle wherein the four upright box panels 46 with cameo-like figures and filigree border are each cast of the present material, as well as the center dial insert 47 and the panel 48 which spans the handset-supporting posts.

The invention may be further illustrated by the following detailed example:

The following composition was blended with an electric mixer:

76g "Epon Resin 826" — Shell
12g "Cardura E" — Shell
12/100g 2-ethylhexyl acrylate - Union Carbide
18g N-aminoethyl piperazine
(Optional) 100 PPM low viscosity, dimethyl poly-siloxane antifoaming agent — General Electric Af66

This composition has a specific gravity of about 1.17 and a viscosity of about 10 to about 20 cps before addition of catalyst. When cast into one-eighth inch wafers of FIG. 2, it achieved a 75 percent cure in about 20 minutes at 150° F., or in about 24 hours at ambient room temperature. When processed by the apparatus of FIG. 1, this 20 minutes is the travel time of conveyor 12 from filling station F to ejection station E. A minimum practical thickness of such wafers is about 0.05 to about 0.10 inch.

It will be seen that the present catalyzed trio of reactive components upon initial setting, yield an uncured but cohesive composition of unusual workability which can thus be formed, even by centrifugal casting, without rupture or strain, and then solidified or cured in the imparted shape. Further, it can be kept in this workable or approximately 75 percent cured state for days at ambient room temperature, and then shaped and solidified in relatively short time by simply raising the temperature. Thus, flexible, wafer-thin castings of fine-detail configuration can be rapidly made of this material, and then by use of a mixture of silicone resin adhesive and silicone polymerization catalyst applied in a backing film, be permanently bonded to diverse supporting surfaces in conforming juxtaposition and there cured in place, even when the supporting surface is at room temperature. By casting such wafers in flexible silicone rubber molds, the incompletely cured but pliant, cohesive castings can be self-ejected simply by flexing the molds; this can be effected in a continuous process by the present apparatus which then subsequently heats and surface-coats the wafers for bonding attachment.

While the particular apparatus for forming attachable incompletely cured plastic wafers herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. Apparatus for forming a molded plastic wafer of polymerizable material and preparing the same for permanent attachment to a supporting surface, said apparatus comprising in combination: conveyor means having attached thereto at least one shallow open-top flexible mold having a cavity the bottom of which is sized and profiled to cast a plastic wafer having a size and profiled surface corresponding to that of said profiled cavity and movable past a mold-charging station and a mold-deforming wafer-ejection station during a predetermined interval required for incomplete polymerization of a charge of initially flowable wafer material present in said mold cavity, means for flexing and deforming said mold at said wafer-ejection station to release the profiled undersurface of the partially cured wafer therefrom onto a supporting surface adapted to support its profiled undersurface without deformation and with its upper generally planar surface exposed upwardly, and applicator means disposed to apply a bonding coat to said generally planar surface of the wafer by means of which the wafer may be fastened in conforming juxtaposition to a supporting surface and cured in situ to an infusible rigid state by further polymerization.

2. Apparatus as defined in claim 1 characterized in that said shallow open-top flexible mold is formed of silicone rubber.

3. Apparatus as defined in claim 1 characterized in the provision of means for heating said mold prior to charging the same with said polymerizable material.

4. Apparatus as defined in claim 1 characterized in the provision of means for heating said coated wafer prior to applying the same against a supporting surface.

5. Apparatus as defined in claim 1 characterized in that said conveyor includes means operable to flex said mold and to eject the wafer with its generally planar surface uppermost and with its exposed profiled surface lowermost, and means for transfering said ejected wafer onto said supporting surface in this same position.

6. Apparatus as defined in claim 1 characterized in that said conveyor means includes a plurality of said flexible molds distributed therealong for advancement in succession past said mold-charging station, and subsequently past said wafer-ejection station.

7. Apparatus as defined in claim 6 characterized in that said apparatus includes means for preheating said molds as the same approach the mold charging station, means for charging said molds in succession at said mold charging station, and means for ejecting the partially cured charge from the molds in succession at said wafer-ejection station.

8. Apparatus as defined in claim 7 characterized in the provision of second conveyor means positioned to receive the wafer as ejected from the respective mold, means for applying a coating to said generally planar surface of each ejected wafer in turn, and means for heating said wafers and the coating thereon while enroute on said second conveyor to a wafer mounting station.

9. Apparatus as defined in claim 6 characterized in that said conveyor means is arranged to advance said charged molds in a substantially horizontal position past said mold charging station and toward said wafer ejection station.

10 Apparatus as defined in claim 1 characterized in the provision of second conveyor means disposed to receive a partially cured wafer discharging from said wafer-ejection station, and stationary guide means interposed between said first mentioned and second conveyor means in supporting contact with the exposed profiled side of said wafer for transfering a partially cured wafer from said flexible mold to said second conveyor means as said mold is undergoing flexing and deformation at said wafer-ejection station.

11. Apparatus as defined in claim 10 characterized in that said guide means comprises a rigid plaque having a trailing edge so positioned that the leading edge of the wafer passes over the upper surface of said rigid plaque as the plaque aids in separating the wafer from the advancing mold while undergoing flexing and deformation.

* * * * *